United States Patent [19]

Dubey

[11] Patent Number: 4,858,316
[45] Date of Patent: Aug. 22, 1989

[54] TUBING CUTTER

[76] Inventor: Thomas W. Dubey, 2601 Lower Roswell Rd., Marietta, Ga. 30062

[21] Appl. No.: 274,915

[22] Filed: Nov. 22, 1988

Related U.S. Application Data

[63] Continuation-in-part of Ser. No. 77,456, Jan. 24, 1987, abandoned.

[51] Int. Cl.⁴ ...................... B23D 21/08; B26D 27/00
[52] U.S. Cl. ......................................... 30/102; 82/70.2
[58] Field of Search ................... 30/90.1, 90.3, 94–99, 30/101, 102; 82/70.2

[56] References Cited

U.S. PATENT DOCUMENTS 3,025,597  3/1962  Huglin .............................. 30/102 X Primary Examiner—Douglas D. Watts
Attorney, Agent, or Firm—James B. Middleton

[57] ABSTRACT

A tubing cutter uses a plier type action for providing cutting force on the tube, and has four cutters that are distributed around the tubing so a small arc of oscillation can be used to cut a tubing. A pair of cutters is mounted on each jaw of the plier-type tool. When the jaws are closed, the axles of the cutters are at the corners of a square in order to provide the optimum geometrical pattern for the cutters. The distance from the center of the cutters to the pivot for the pliers should be about twice the distance between the adjacent cutters. The tool uses only cutters, and no guides, so the tool can be held in position and moved through a small arc; then, the score line will facilitate continued motion on the same line.

4 Claims, 1 Drawing Sheet

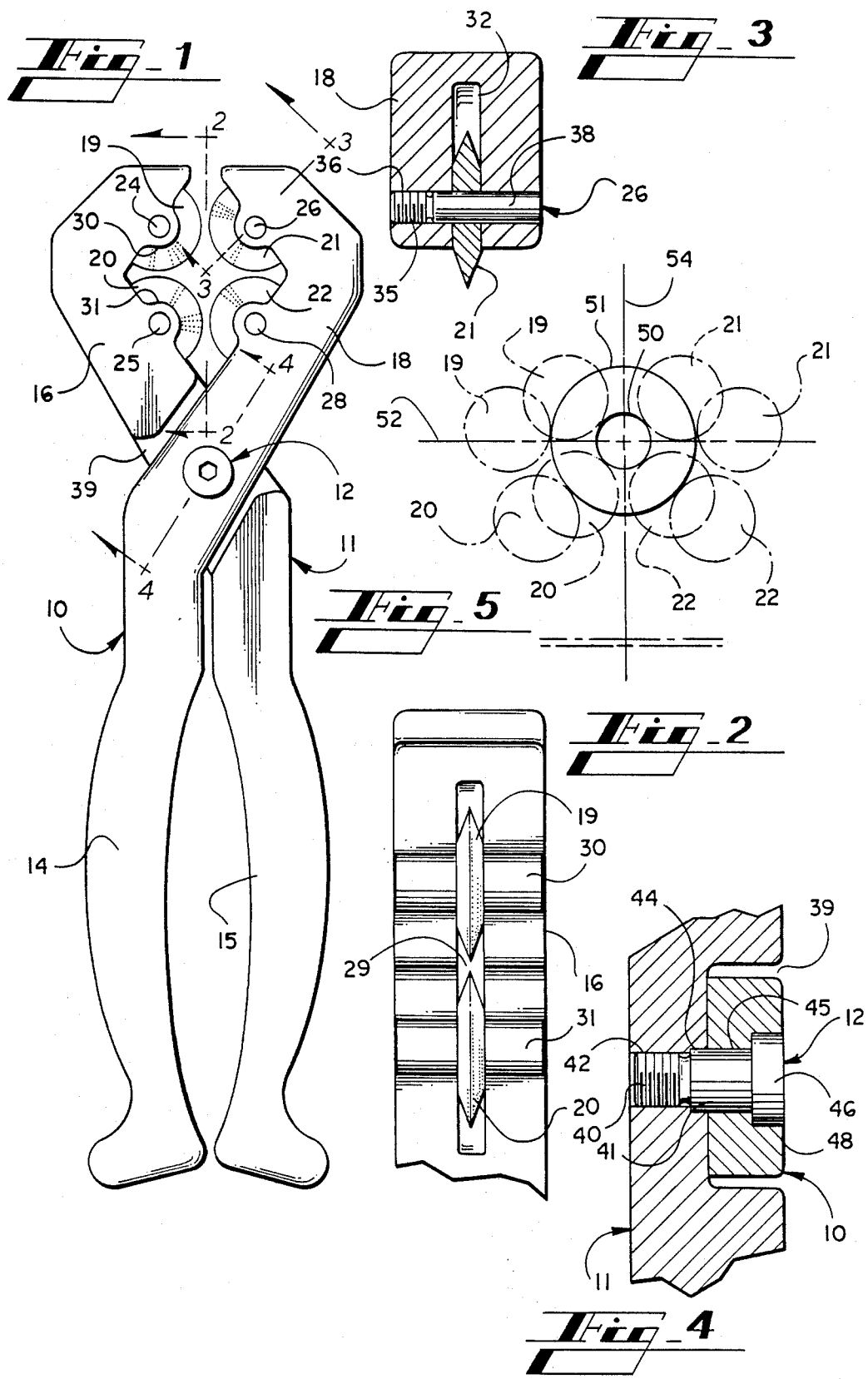

4,858,316

TUBING CUTTER

CROSS-REFERENCE TO RELATED APPLICATION

This is a continuation-in-part of the application of the same inventor, filed Jan. 24, 1987, under Ser. No. 077,456, having the title "Cutting Tool", now abandoned.

INFORMATION DISCLOSURE STATEMENT

It is common to utilize tubing in many aspects of construction. Tubing is used to carry water, refrigerent, and numerous other fluids for both domestic and commercial uses. During the installation of a tubing system, a person normally has long lengths of the tubing, and these are cut to the desired lengths. As a result, many cuts must be made in the course of any installation. When a repair or addition is required in tubing, one generally cuts the tubing wherever the repair or branch is to be made, removing a section if required. Again, many cuts may be necessary.

For new installations, one can usually cut the tubing as desired so that the space for cutting is not restricted; however, in additions and repairs, the location may be such that the cutting space is very restricted. In either case, however, reduction of the time for making each cut will substantially speed the total job, reducing the labor costs.

Prior art tubing cutters generally include two or more guide rollers that receive and hold a length of tubing, while one or more cutting blades are engaged with the tubing to cut the tubing. Even when the prior art has used two or more cutters, guide rollers have been used in an effort to hold the tubing in proper alignment while the cutters sever the tubing. See, for example, U. S. Pat. No. 2,325,353 issued to Wright. Also, as is disclosed in the Wright patent, the prior art generally provides a screw arranged for continually tightening the assembly to cause the cutter to cut progressively deeper into the wall of the tubing. Even when a plier type pivoted arrangement has been used, as in U. S. Pat. Nos. 2,230,030 and 3,672,050, a screw arrangement is used to provide the progressive tightening.

Since tubing is used in many different industries and for many purposes in each industry, the prior art tubing cutters have generally sought to cut a wide range of sizes of tubing, the idea being to sell one tubing cutter to virtually anyone who works with tubing. This need to cut a wide range of diameters of tubing causes the tubing cutters to be rather large and cumbersome, especially if one cuts primarily small sizes of tubing.

SUMMARY OF THE INVENTION

This invention relates generally to cutting devices, and is more particularly concerned with a plier type tubing cutter having multiple cutters to provide quick cutting with oscillation through a small arc.

The present invention provides a plier type tubing cutter having a plurality of cutting wheels. The cutting wheels are arranged to be equally spaced when the pliers are fully closed, this arrangement providing the optimum configuration for cutting the predetermined range of tubing sizes.

In the preferred embodiment of the invention, there are four cutters; and, when the pliers are closed, the cutter axes are arranged on the corners of a square. The cutters are mounted for rotation about axes fixed to the plier jaws, and all the cutters are precisely aligned so that all cutters will engage one circumferential line on the tubing to be cut. Further, the pivot for the pliers is precisely constructed for pivotal motion without lateral motion to maintain the cutters in their desired alignment. With the precise construction described, the cutters will score a line on the tubing, and the cutters will subsequently follow the score line so the full cut will be made on the initial score line.

BRIEF DESCRIPTION OF THE DRAWINGS

These and other features and advantages of the present invention will become apparent from consideration of the following specification when taken in conjunction with the accompanying drawings in which:

FIG. 1 is a side elevational view showing one form of tubing cutter made in accordance with the present invention;

FIG. 2 is an enlarged, fragmentary view, taken substantially along the line 2—2 in FIG. 1;

FIG. 3 is an enlarged cross-sectional view taken along the line 3—3 in FIG. 1;

FIG. 4 is an enlarged cross-sectional view taken along the line 4—4 in FIG. 1; and, FIG. 5 is a rather schematic illustration showing the arrangement of the cutters on the minimum and maximum tubing sizes to be cut by the device shown in FIG. 1.

DETAILED DESCRIPTION OF THE EMBODIMENT

Referring now more particularly to the drawings, and to that embodiment of the invention here presented by way of illustration, the tubing cutter shown in FIG. 1 is generally in the form of a pair of pliers having pivoted members 10 and 11, the pivot being generally designated at 12. The members 10 and 11 include handles 14 and 15 on one side of the pivot 12 and operating jaws 16 and 18 on the opposite side of the pivot. The operating jaws 16 and 18 mount cutter wheels designated at 19, 20. 21 and 22. Each of the cutters 19 and 20 is mounted on the jaw 16 by axles 24 and 25 respectively; and, each of the cutters 21 and 22 is mounted on the jaw 18 by axles 26 and 28 respectively.

With this general description in mind, it will be understood by those skilled in the art that the pivoted members 10 and 11 can be pivoted with respect to each other to open the jaws 16 and 18 with respect to each other to allow the cutters 19-22 to be received over a tubing to be cut. The handles 14 and 15 of the tubing cutter can be grasped to urge the cutters 19-22 against the tubing; then, the tubing cutter can be oscillated, causing the cutters 19-22 to roll around the circumference of the tubing. During this oscillation, pressure on the handles 14 and 15 will gradually urge the cutters 19-22 into the wall of the tubing. For this technique, it will be readily understood that the cutters 19-22 are aligned with one another. FIG. 2 illustrates two of the cutters and shows their alignment. The cutters 21 and 22 mounted on the jaw 18 are mounted in the same way, so all four of the cutters are precisely aligned with one another.

Looking at FIG. 2 in more detail, it will be seen that the jaw 16 is provided with a slot 29 to receive the cutters 19 and 20. Also, extending generally across the width of the jaw 16 there are axle housings 30 and 31. The axle housings 30 and 31 are preferably formed integrally with the jaw 16 and simply act as pillow block bearings rotatably mounting the cutters 19 and 20. It is important to note in FIG. 2 of the drawings that the cutter wheels 19 and 20 fit snuggly into the slot 29, and the axle housings 30 and 31 maintain the cutter wheels 19 and 20 in a precise location. Since the cutter wheels 19 and 20 are closely confined at both sides, the cutter wheels 19 and 20 must remain precisely aligned, with substantially no deviation.

Looking also at FIG. 3 of the drawings, FIG. 3 is a cross-sectional view taken through the cutter wheel 21 and showing the details of the mounting of the cutter wheel 21. All of the cutter wheels are mounted in the same way.

In FIG. 3, the jaw 18 is provided with a slot 32 for receiving the cutter wheels 21 and 22, and the axle housing 34 receives the axle 26 for the cutter wheel 21. It will be noted that the axle 26 includes a threaded end 35 to be threadedly received by a threaded hole 36 in the axle housing 34. The opposite end of the axle 26 is of a larger diameter, and is received in a somewhat larger opening 38. Thus, the axle 26 is carefully sized to be received through the cutter wheel 21, to provide a snug, but rotatable, fit with the cutter wheel 21. The axle 21 then passes completely through the cutter wheel 21 and into the hole 36 where the threaded end 35 locks the axle 26 in place. The cutter wheel 21 is therefore very securely held so the cutter wheel cannot move laterally, cant or the like.

Again, it should be realized that all of the cutter wheels 19–22 are mounted in precisely the same way, so the above discussion is applicable to each of the cutter wheels and will not be repeated.

For the cutter wheels 19–22 to remain accurately aligned, it will be understood that it is also necessary for the jaws 16 and 18 to remain accurately aligned. To assure proper alignment while allowing pivotal motion, the arrangement shown in detail in FIG. 4 of the drawings is utilized. First, it will be understood by those skilled in the art that, in a pair of pliers, one conventionally finds channels in each of the members 10 and 11 in the vicinity of the pivot to allow the jaws 16 and 18 to be aligned. FIGS. 1 and 4 illustrate the channel 39 in the member 11 and it will be understood that there is a similar channel on the back side of the member 10. This arrangement is well known to those skilled in the art, and no further description is thought to be necessary. In the present invention, however, it is especially important that the mating surfaces of the members 10 and 11 are quite flat to prevent any distortion as the members 10 and 11 are pivoted with respect to each other.

Looking, then, at FIG. 4 of the drawings, it will be seen that the member 10 is shown within the channel 39 of the member 11, and the pivot 12 secures the two members together. In order to be sure that the members 10 and 11 are held closely together while allowing pivotal motion, the pivot 12 is formed by a groove having a threaded portion 40 and shank portion 41. The threaded portion 40 is the smallest diameter, and is received in a threaded opening 42 in the member 11. The shank 41 is somewhat larger than the threaded portion 40 and seats within a bore 44. Due to this arrangement, it will be understood that the screw can be well tightened into the member 11.

The member 10 defines a hole 45 accurately sized to receive the shank 41 in pivotal relationship; and, a head 46 on the pivot 12 is larger than the shank 45 and preferably recessed within a bore 48 in the member 10. With this construction, it will be understood that the member 10 is pivotal with respect to the member 11; but, due to the close tolerances between the pivot 12 and the hole in the member 10, the members 10 and 11 cannot move laterally with respect to each other.

With the foregoing in mind, attention is directed to FIG. 5 of the drawings for an understanding of the operation of the device. In considering the operation of the present invention, it should first be understood that the individual who installs tubing systems normally works with a fairly narrow range of sizes of tubing. The present invention is therefore designed to cut a reasonable range of tubing diameters rather than all tubing diameters. By making this limitation, the tubing cutter of the present invention is very convenient to utilize, and will very quickly cut the tubing normally installed by a given person.

In FIG. 1 of the drawings, it will be understood that the jaws 16 and 18 are completely closed and there is of course a significant space between cutter wheels 19–22. It will therefore be obvious that a piece of tubing that will fit completely within this space cannot be cut by the cutter shown in FIG. 1. At the opposite extreme, it will be understood that the inner cutter wheels 20 and 22 must remain on one side of a diameter of the tubing to be cut while the outer cutter wheels 19 and 21 must be on the opposite side of the same diameter. This is necessary for gripping of the tubing to allow a cut to be made. Looking then at FIG. 5 of the drawings, there is a small diameter tubing designated at 50 and a large diameter tubing designated at 51. The four cutters 19–22 are shown in engagement with the tubing 50, the cutters being shown in dashed lines. The cutters 19–22 are also shown in engagement with the tubing 51, the cutters being shown in dot-dashed lines.

The tubing 50 is about the smallest diameter tubing that can be cut with the cutter shown in FIG. 1 of the drawings. It will be noticed that the cutters have been moved only slightly apart beyond their rest position shown in FIG. 1. This is just sufficient for the cutters to move inwardly to penetrate the wall of the tubing 50. It will also be noticed that the cutters are spaced around the tubing 50 at very close to ninety degrees apart. With this spacing, it will be readily understood that the cutting tool must be rotated only until, for example, cutter 21 engages the score-line originally created by the cutter 19. This fact renders the required motion of the cutting tool small in order to cut a piece of tubing.

The maximum size tubing to be cut by the cutter shown in FIG. 1 of the drawings is designated at 51. It will be understood that cutters 19 and 21 must be separated sufficiently to allow the tubing 51 to pass between the cutters; then, the cutters must be able to engage the tubing 51 on the opposite side of the diameter 52 from the cutter wheels 20 and 22. Looking at the cutter wheels as shown in FIG. 5, it will be obvious that no gripping of the tube 51 could take place if the cutter wheels 19 and 21 are on the same side of the diameter 52 as are the cutting wheels 20 and 22.

It is obvious that the cutting tool must be moved through a greater arc to cut the tube 51. Again, the wheel 21 must be moved sufficiently to engage the score line created by the cutter 19. These cutters are somewhat less than one hundred eighty degrees apart so that a total motion of somewhat less than one hundred eighty degrees will be required to cut the tubing 51.

Whereas the prior art tubing cutters utilized some form of tubing guide means, it will be noted that the cutter of the present invention has only the four cutters to engage the tubing. It has been determined that the omission of the guide mean provides a superior tubing cutter in that there is no guide means to scratch the surface of the tubing and also in that some angular variation in cut is possible if desired. In using the cutter of the present invention, if it is desired to made a square cut of the tubing, it will be understood that the handles 14 and 15 will be moved apart to cause the jaws 16 and 18 to move apart and allow the tubing to be placed between the cutters 19-22. Since the surface of the tubing is curved, it will be readily understood that when the jaws 16 and 18 are closest together, a perfectly square cut will be provided. Due to this simple fact, the guide means is not required and a person of ordinary skill can make a completely square cut. On the other hand, if it is desired to make a cut at a slight angle with respect to the center line of the tubing, it will be understood that the tool can be slightly angled with respect to the tubing, allowing the handles 14 and 15, hence the jaws 16 and 18, to separate slightly. With the tool held as desired, the tool can be rotated about the tubing so that each of the cutters 19-22 engages the tubing. When the tool is rotated about the tubing, each of the cutters 19-22 will make a score line in the tubing. Once the entire circumference of the tubing has been scored, the cutter can be repeatedly oscillated about the tubing, and the cutters will ride in the previously made score lines. Continued oscillation of the tool with pressure on the handles 14 and 15 will cause the cutters 19-22 to cut more and more deeply into the wall of the tubing, eventually to sever the tubing along the intended line.

The plier type pivoted arrangement is also important to the present invention. An operator can very quickly separate the handles 14 and 15, causing the jaws 16 and 18 to move apart and allow the cutters to receive a piece of tubing therebetween. With the pincer-like arrangement of the jaws 16 and 18, it will be understood that the jaws 16 and 18 can be, for example, inserted into an opening in a wall to cut a piece of tubing without requiring an extensive opening completely around the tubing. In this regard, it will be realized in looking at FIG. 5 of the drawings that the cutting tool can be rotated in one direction to cause the cutter 19 to pass the diameter 54; then, the tool can be moved in the opposite direction to cause the cutter 21 to pass the diameter 54. To cut the tubing 50, it will therefore be understood that motion in an arc of about forty-five degrees in each direction will be required to cut the tubing. This will provide a very simple and quick oscillatory motion to cut the tubing 50. While the motion to cut the tubing 51 is greater, the motion is still considerably less than the three-hundred sixty degrees that is required for numerous prior art tubing cutters.

Another feature to be considered in a cutter made in accordance with the present invention is the relative placement of the pivot 12. By placing the pivot 12 well away from the cutter wheels 19-22, the angle of the jaws 16 and 18 with respect to each other will remain slight; however, extremely long handles 14 and 15 will be required for manipulation of the tool. If the pivot 12 is very close to the cutters 19-22, the angle of the jaws with respect to each other will be great, preventing use of the tool on large tubes. Thus, the optimum arrangement is achieved by arranging the cutters 19-22 on a square, the axles of the cutters being at the corners of the square. Using this square as a reference, the side of the square is equal to 1, so the distance from the axle 24 to the axle 26 is 1. If diagonals of the reference square are constructed, the point at which the diagonals cross is the center of the four cutters; and, from this point to the pivot 12 is a distance of 2. For convenience, the distance from the pivot 12 to the ends of the handles 14 and 15 may be about 7.

It should be realized that the above dimensions are relative, and are empirical, so many variations can be made to adapt the tool to a specific need. Nevertheless, by following the rule approximately, the tubing cutter will be useful for a reasonable range of sizes for tubing.

It will of course be understood by those skilled in the art that particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A tubing cutter for cutting tubes having a diameter between a first diameter and a second diameter, said tubing cutter including a pair of opposed jaws, each jaw of said pair of jaws mounting at least one cutter and at least one jaw of said pair of jaws mounting a plurality of cutters, all of said cutters being aligned with one another to engage a single circumferential line on a tube, pivot means for pivoting said jaws with respect to each other, and a pair of handles, each handle of said pair of handles being fixed to one of said jaws, said handles and said jaws being on opposite sides of said pivot means, the arrangement being such that said handles can be separated to cause said jaws to separate for receiving a tube therebetween, said plurality of cutters on said at least one jaw being arranged such that a straight line drawn through all their axes is parallel to a centerline of said tubing cutter extending between said pair of jaws, through said pivot means and between said handles, said at least one cutter comprising two cutters and said plurality of cutters comprising two cutters, so that each jaw of said pair of jaws mounts two cutters, said cutters being circular in configuration and including an axle for rotatably mounting said cutter, said cutters being so arranged that said axles of said cutters are at the corners of a reference square when said jaws are at their closed position, each jaw of said pair of jaws including an axle housing for each of said cutters, each axle housing defining an opening therethrough for receiving an axle for said cutters, said jaw further defining a slot therein for receiving said cutter, said axle housing having a slot coextensive with said slot in said jaw, said cutter having a thickness to be snugly received in said slot and rotatable on said axle.

2. A tubing cutter as claimed in claim 1, wherein the length of a side of said reference square equals x, and the distance from the intersection of the diagonals of said reference square to said pivot means is approximately 2x, and wherein the length of said handles is approximately 7x.

3. A tubing cutter as claimed in claim 2, wherein one of said jaws and one of said handles are integrally formed and constitute a first member, and the other of said jaws and the other of said handles are integrally formed and constitute a second member, said pivot means acting to connect said first member and said second member and including a shank, means for fixing said shank to said first member, a bore in said second member sized to receive said shank, and a head on said shank for retaining said second member in position on said shank.

4. A tubing cutter as claimed in claim 3, said means for member extending from said shank, and a threaded opening in said first member.

* * * * *